(12) United States Patent
Murray et al.

(10) Patent No.: US 7,064,655 B2
(45) Date of Patent: Jun. 20, 2006

(54) VARIABLE-ECCENTRICITY TACTILE GENERATOR

(75) Inventors: Matthew J. Murray, Raleigh, NC (US); Michael Townsend, Durham, NC (US); Chris Eaton, Cary, NC (US); Gregory S. Patterson, Morrisville, NC (US)

(73) Assignee: Sony Ericsson Mobile Communications AB (SE)

( * ) Notice: Subject to any disclaimer, the term of this patent is extended or adjusted under 35 U.S.C. 154(b) by 179 days.

(21) Appl. No.: 10/827,044

(22) Filed: Apr. 19, 2004

(65) Prior Publication Data

US 2005/0140503 A1 Jun. 30, 2005

Related U.S. Application Data

(60) Provisional application No. 60/533,644, filed on Dec. 31, 2003.

(51) Int. Cl.
*H04B 3/36* (2006.01)
(52) U.S. Cl. ............... 340/407.1; 340/679; 340/683; 340/686.3
(58) Field of Classification Search ................ 340/679, 340/683, 686.3, 407.1
See application file for complete search history.

(56) References Cited

U.S. PATENT DOCUMENTS

| | | | |
|---|---|---|---|
| 3,920,222 A | * | 11/1975 | Brander ................. 366/114 |
| 4,034,614 A | | 7/1977 | Fors et al. |
| 6,323,757 B1 | | 11/2001 | Nagai |
| 6,693,622 B1 | * | 2/2004 | Shahoian et al. ........... 345/156 |
| 6,711,258 B1 | | 3/2004 | Sung |

FOREIGN PATENT DOCUMENTS

| | | |
|---|---|---|
| DE | 18 04 955 | 5/1969 |
| EP | 0 667 672 | 8/1995 |
| WO | WO 91/20136 | 12/1991 |

OTHER PUBLICATIONS

PCT International Search Report; International Application No. PCT/US2004/020409; mailed Nov. 30, 2004.

* cited by examiner

*Primary Examiner*—Daryl C. Pope
(74) *Attorney, Agent, or Firm*—Coats & Bennett, P.L.L.C.

(57) ABSTRACT

A tactile generator comprises an eccentric mass that imparts a vibration as it rotates about a rotational axis. The mass is radially movable with respect to the rotational axis such that the distance between the mass and the axis is variable. Varying the distance of the mass from the axis varies the amount of vibration generated when the mass is rotated. The amount of vibration may be controlled responsive to a detected level of ambient noise.

45 Claims, 8 Drawing Sheets

VARIABLE-ECCENTRICITY TACTILE GENERATOR

RELATED APPLICATIONS

This application claims priority under 35 U.S.C. § 119(e) from U.S. Application Ser. No. 60/533,644 filed on Dec. 31, 2003, which is expressly incorporated herein by reference.

BACKGROUND

The present invention relates generally to tactile generators, and particularly to tactile generators in wireless communications devices.

Tactile generators produce vibration by rotating an unbalanced load with a motor. The amount of vibration produced in a given tactile generator is a function of the mass of the unbalanced load, the distance of the center of mass of the load from a rotational axis, and the speed at which it rotates. In conventional devices, these parameters are often fixed by the manufacturer and cannot be changed. As a result, the amount of vibration that can be imparted by conventional devices is also fixed.

Further, in conventional devices, the center of mass of the load resides at a fixed distance from the rotational axis, and as such, typically requires a fixed amount of current to start the load rotating. This starting current is substantially greater than the corresponding operating current for a given motor design. However, a device that is unable to draw the requisite amount of starting current will be unable to rotate the load to produce vibration. Accordingly, what is needed is a device that can produce varying amounts of vibration and is capable of operating on reduced starting current loads.

SUMMARY

The present invention provides a tactile generator comprising an eccentric mass that imparts varying levels of vibration as it rotates about an axis. In one embodiment, an electric motor rotates the mass about the axis. The mass is radially movable with respect to the axis such that the distance between the mass and the axis is variable. Varying the distance of the mass from the axis varies the amount of vibration generated when the mass is rotated. The amount of vibration produced by the rotating mass, is dependent on the rotational speed of the mass, and the distance from the center of mass from the axis of rotation.

The present invention may be embodied, for example, in a wireless communications device comprising a transceiver coupled to an antenna, and a controller that generates a control signal indicative of a measured ambient noise level. The tactile generator is responsive to the control signal, and produces a variable vibration by varying the distance of the mass from the axis.

DETAILED DESCRIPTION

Figure 1A:
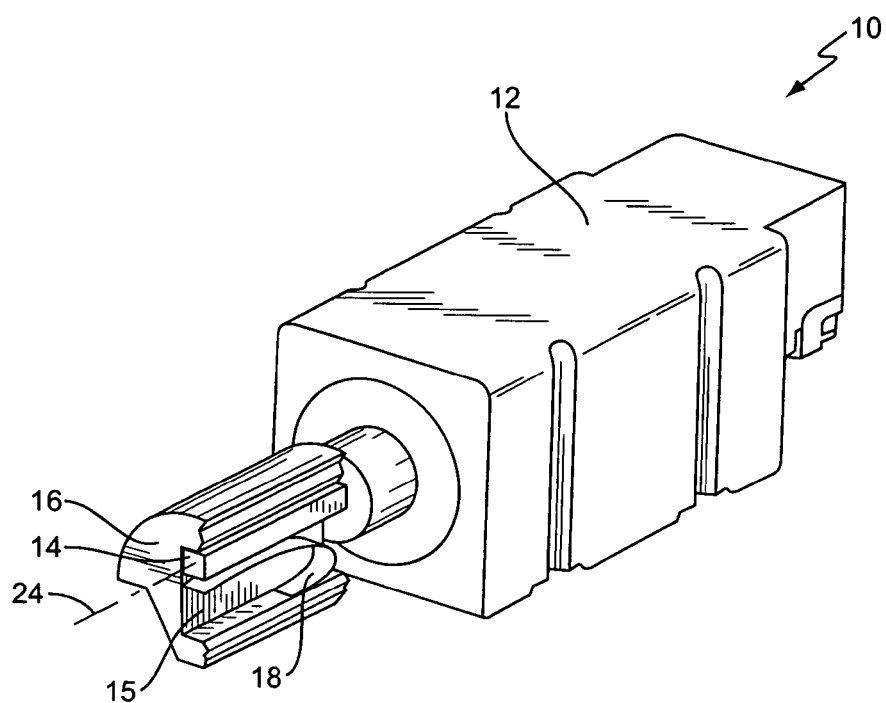
FIG. 1 illustrates perspective views of one embodiment of the present invention.

Referring now to FIG. 1, one embodiment of the present invention is shown therein and indicated generally by the number 10. Tactile generator 10 comprises a motor 12, an output shaft 14, an eccentric mass 16, and a biasing member 18. As used herein, eccentric means that the center of gravity of a mass is off-center of the axis of rotation.

Motor 12 comprises an electric motor that couples to a printed circuit board (not shown), and may be a variable speed motor. Motor 12 can be controlled to draw varying levels of current from the power source, thereby rotating the output shaft 14 at various speeds. As will be described later in more detail, this varying amount of rotational speed can be transcribed into varying levels of vibration sensed by the user.

Output shaft 14 is connected to one end of motor 12, and extends longitudinally from motor 12. When motor 12 is energized, it rotates output shaft 14 about a longitudinal axis 24. The rotational speed of output shaft 14 depends upon, and is proportional to, the current drawn by motor 12. For example, the more current that is drawn by motor 12, the faster output shaft 14 will rotate about axis 24.

Mass 16 comprises a weight having a slot 15 that inserts onto output shaft 14. The rotation of output shaft 14 about axis 24 causes mass 16 to rotate eccentrically about axis 24. Because motor 12 may operate at various speeds, mass 16 may likewise rotate at various speeds about axis 24. Mass 16 is preferably shaped or weighted to purposefully provide an unbalanced load when rotated by output shaft 14, which the user senses as vibration.

Figure 1B:
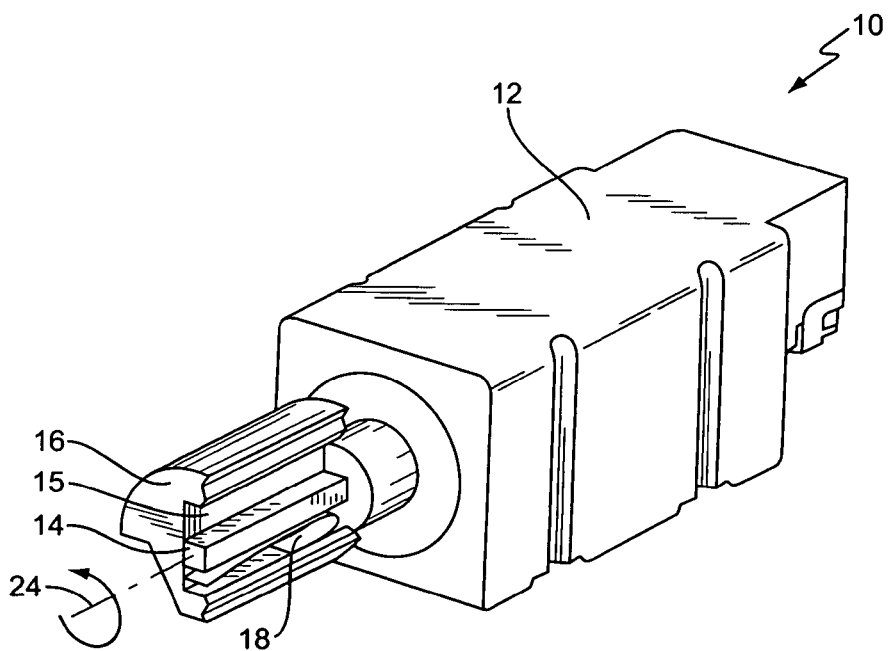

Biasing member 18 is disposed in slot 15 between the output shaft 14 and an interior surface of mass 16. As shown in FIG. 1A, biasing member exerts a biasing force that urges mass 16 towards axis 24. Biasing member 18 also permits the outward radial movement of mass 16 with respect to axis 24 when mass 16 rotates eccentrically about axis 24, as shown in FIG. 1B. More particularly, biasing member 18 urges mass 16 inwardly towards shaft 14 and axis 24, and resists the tendency of mass 16 to move outwardly during rotation. The amount of resistance to the outward radial movement of mass 16 may be controlled by carefully selecting the biasing member 18 for certain stiffness. Upon reaching a sufficient rotational speed threshold, the centrifugal force experienced by mass 16 overcomes the biasing force, and causes mass 16 to move radially outward from axis 24. However, as mass 16 moves radially outward from axis 24, the rotational speed of mass 16 may tend to decrease. To counter this tendency and maintain a desired rotational speed, more current may be applied to motor 12 to increase the torque applied to output shaft 14. As will be described below in more detail, this allows the present invention to produce varying vibration levels while reducing the amount of current necessary for starting the motor 12.

Therefore, the distance of the mass 16 from the axis 24 of rotation is dependent on the rotational speed of output shaft 14. That is, the faster that shaft 14 rotates, the farther mass 16 moves radially outward from axis 24. Conversely, the slower that shaft 14 rotates the closer mass 16 moves radially inward towards axis 24. Thus, biasing member 18 permits mass 16 to achieve various positions during rotation, which translates into varying amounts of vibration.

The present invention enables the use of smaller, less expensive motors as compared to conventional devices. In conventional vibrators with a fixed mass, the motor must provide sufficient torque to overcome the inertia of the mass. In general, the torque required to start rotation of the mass will be much greater than the torque required to keep it rotating. Further, the torque required will be dependent on the distance of the mass from the axis of rotation. Using the present invention, the mass 16 is urged close to the rotational axis 24 by the biasing member 18 when the motor 12 begins rotating. Thus, less torque is required to begin rotation of the mass 16 and consequently, a smaller, less expensive motor can be used.

Additionally, because conventional devices pre-position the mass at a fixed distance from the axis of rotation, they are only able to produce one level of vibration. In the present invention, the position of mass 16 varies with respect to output shaft 14 thereby permitting vibratory output over a range of vibration levels. That is, the level of vibration imparted by the present invention varies with the distance of mass 16 from axis 24.

Figure 2A:
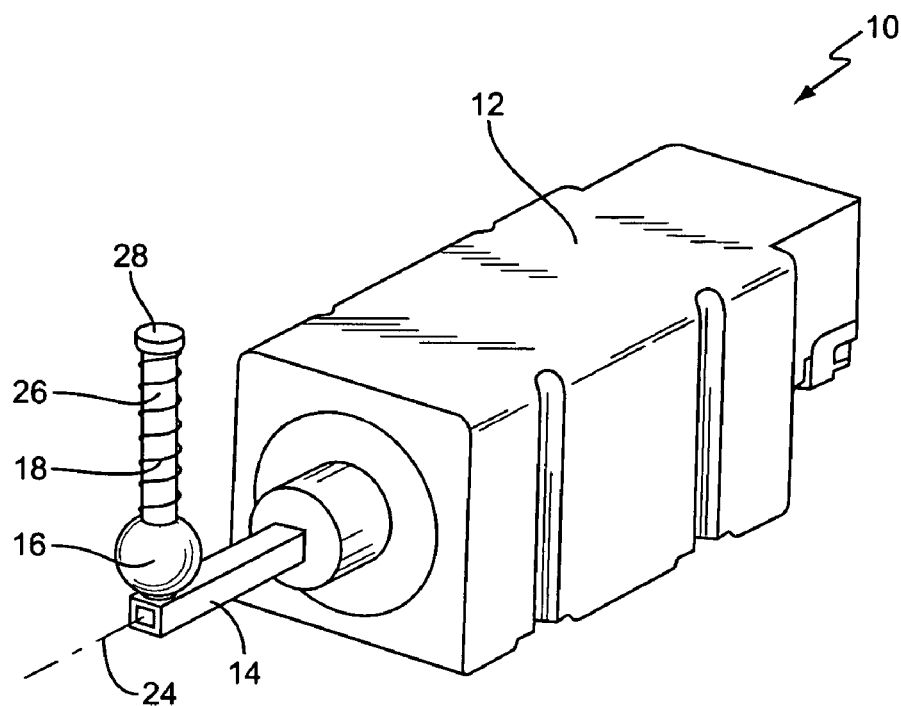
FIG. 2 illustrates an alternate embodiment of the present invention.
Figure 2B:
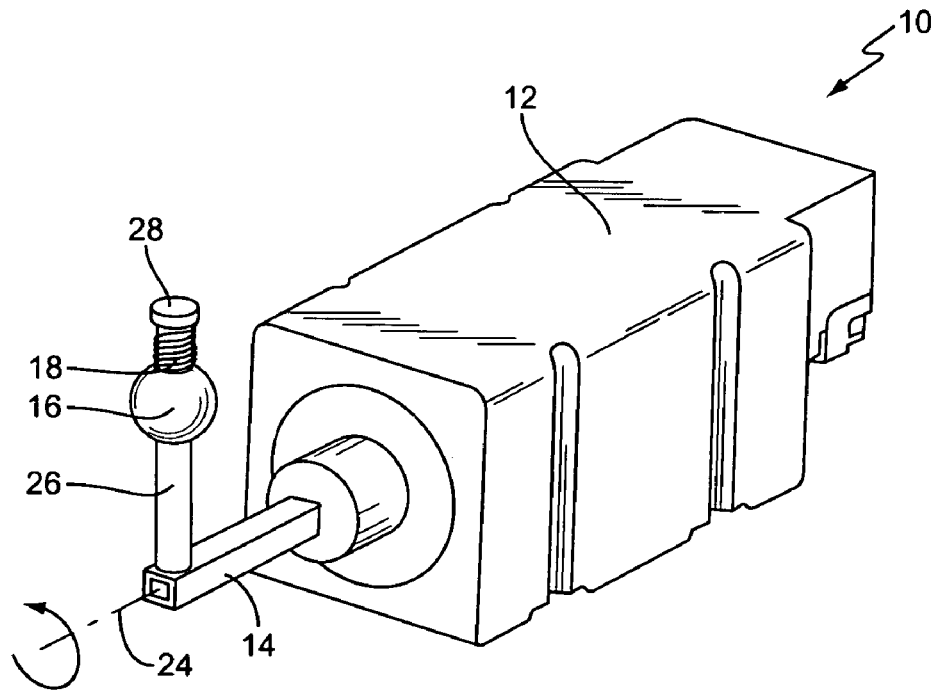

In an alternate embodiment shown in FIG. 2, an extension 26 having mechanical stop 28 is attached to shaft 14, and mass 16 fits over extension 26. Biasing member 18, shown here as a coil spring, is disposed between mechanical stop 28 and mass 16. Like the previous embodiment, biasing member 18 biases mass 16 towards axis 24 when shaft 14 is stationary or is rotating at a speed below the threshold (FIG. 2A). Mass 16 may remain in this position until shaft 14 reaches a sufficient rotational velocity. When this threshold is reached, the centrifugal force experienced by mass 16 overcomes the biasing force applied by biasing member 18. Mass 16 then slides along extension 26 radially outward from axis 24 towards mechanical stop 28. The distance of mass 16 from axis 24, and thus, the amount of vibration produced, is dependent upon the rotational speed of mass 16.

Figure 3A:
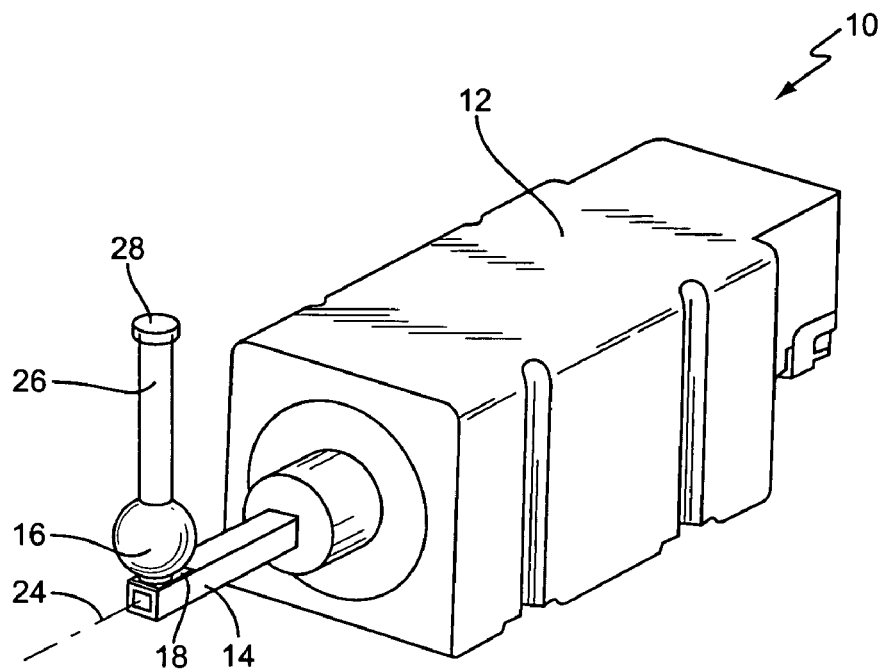
FIG. 3 illustrates another embodiment of the present invention.
Figure 3B:
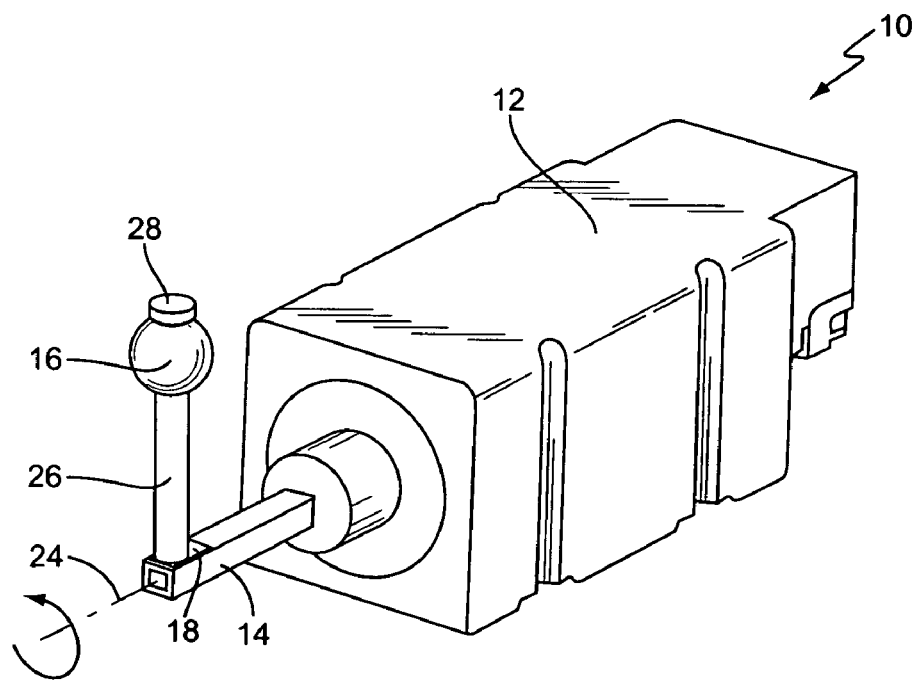

FIG. 3 illustrates another embodiment of the present invention that does not use a spring as a biasing force, but rather, employs a magnet as biasing member 18. Further, this embodiment permits vibration at two distinct levels. Biasing member 18 in this embodiment is attached to, or integrally part of, shaft 14. When shaft 14 is at rest or rotating at a speed lower than the threshold speed (FIG. 3A), the magnetic biasing member 18 attracts (i.e., urges) mass 16 inwardly towards axis 24. Mass 16 remains magnetically attached to biasing member 18, and produces a vibration at a first level until shaft 14 reaches a sufficient rotational velocity. When the centrifugal force experienced by the rotating mass 16 overcomes the magnetic attractive force, mass 16 breaks the grip of the magnetic grasp of biasing member 18. The centrifugal force causes the mass 16 to slide up extension 26 until mass 16 contacts mechanical stop 28. In this position, tactile generator 10 produces vibration at a second level.

Figure 4A:
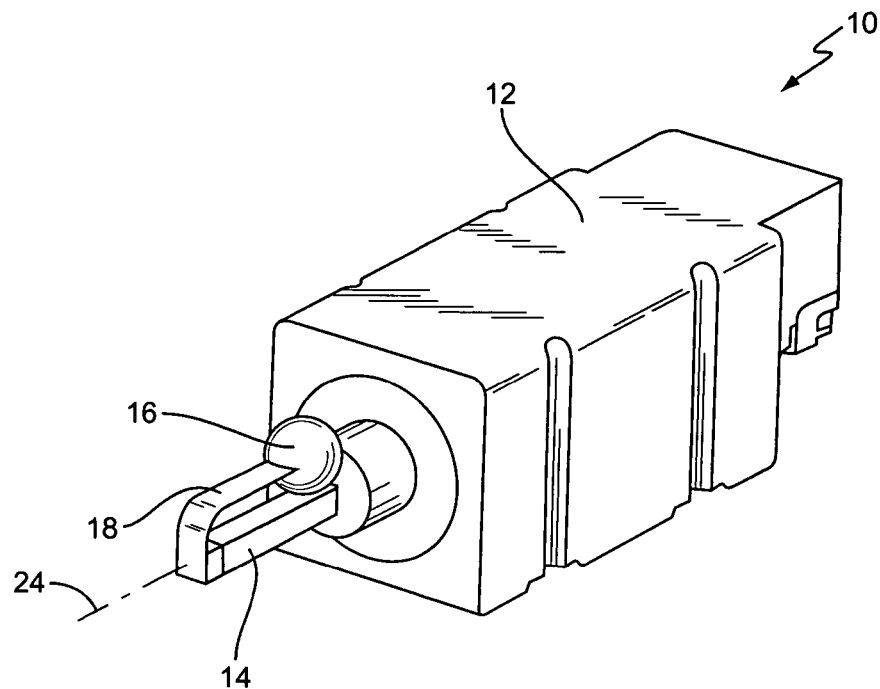
FIG. 4 illustrates another embodiment of the present invention.

The embodiment of FIG. 4, while different in structure, also generates various levels of vibration by permitting mass 16 to achieve varying distances from axis 24. In this embodiment, biasing member 18 is a leaf spring that interconnects mass 16 to a terminal end of shaft 14. When shaft 14 is stationary, or rotating at a speed lower than the threshold speed (FIG. 4A), the biasing member 18 biases mass 16 close to the axis 24 and the shaft 14. When shaft 14 reaches a sufficient rotational velocity, the centrifugal force imparted on mass 16 causes it to move radially outward from axis 24. As in the previous embodiments, the distance of mass 16 from axis 24, and thus, the amount of generated vibration, is dependent upon the rotational speed of mass 16. As stated above, the rotational speed of the mass 16 is dependent on the current supplied to the motor.

Figure 4B:
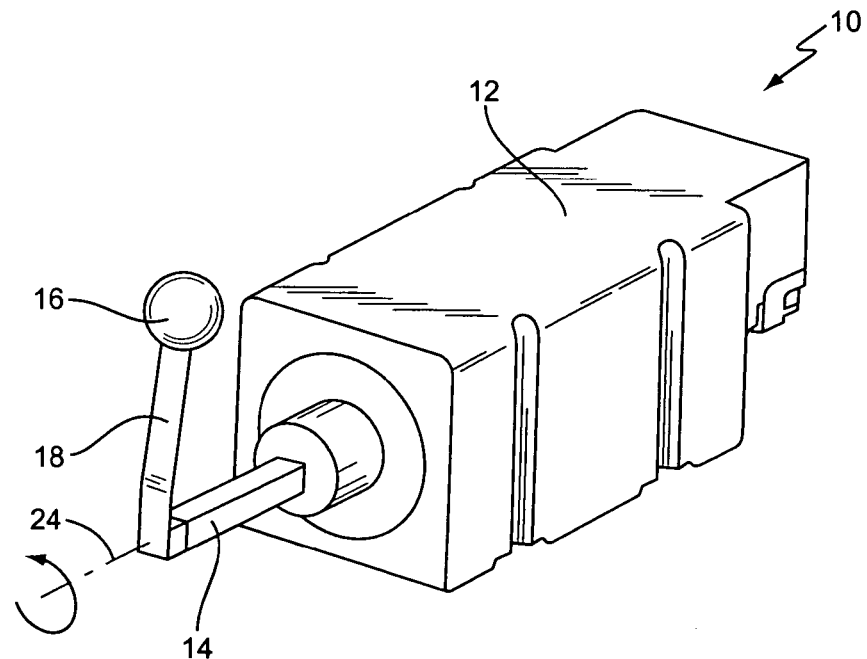

Generally, the embodiment of FIG. 4 should allow movement of mass 16 such that it only achieves a position that is at a substantially right angle with respect to axis 24 when shaft 14 rotates at full speed. At slower speeds, mass 16 may be at any position between shaft 14, and the position shown in FIG. 4B. Further, it may be noted that in this embodiment, mass 16 does not explicitly move in a direction substantially normal to shaft 14. However, at any given moment in time, the radial distance of mass 16 from shaft 14 varies depending upon the rotational speed of motor 12, the current supplied to motor 12, and the characteristics of biasing member 18. Therefore, for the purposes herein, mass 16 of FIG. 4 is also considered to move radially inwardly and outwardly with respect to axis 24 even though it also moves in the axial direction.

Figure 5:
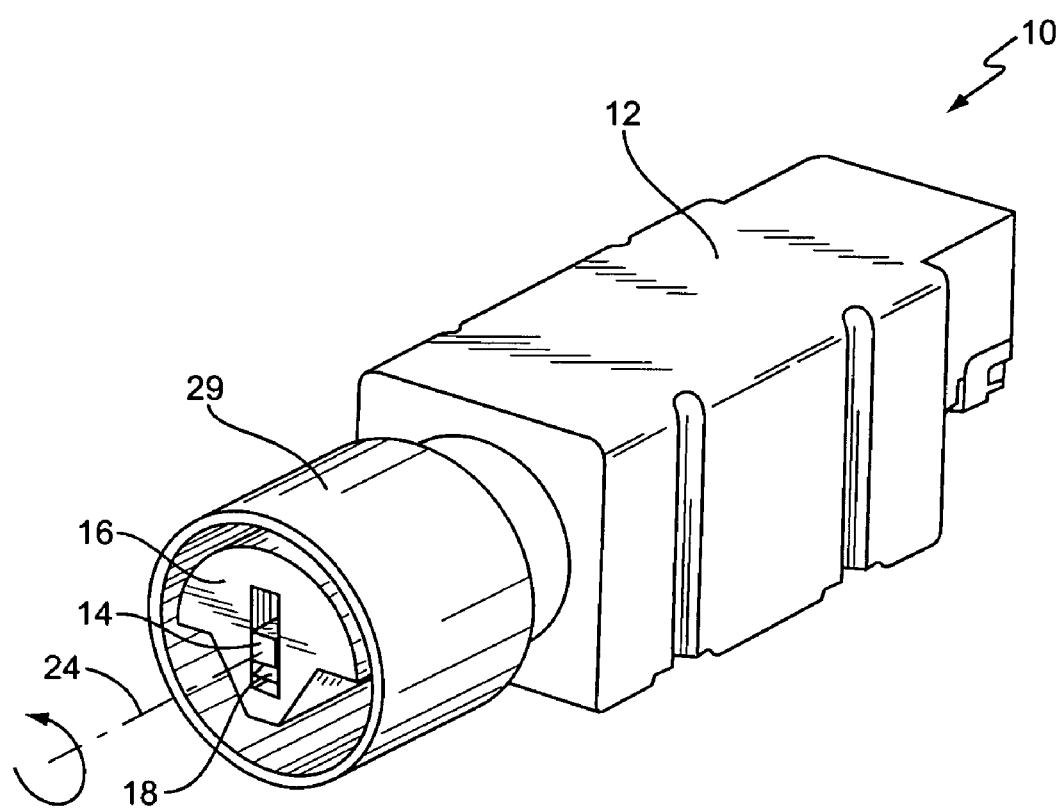
FIG. 5 illustrates another embodiment of the present invention.

FIG. 5 illustrates an alternate embodiment in which an electromagnetic enclosure 29 surrounds mass 16. Electromagnetic enclosure 29 may be, for example, an electromagnet sleeve powered by current from motor 12, or alternatively, some other source. Electromagnetic enclosure 29 provides a means of controlling the position of mass 16 that is independent from biasing member 18. More particularly, biasing member 18 urges mass 16 inwardly towards axis 24. When shaft 14 rotates, mass 16 tends to move radially outward from axis 24. Like the previous embodiments, biasing member 18 resists the outward movement of mass 16 until the rotational speed is such that the centrifugal force experienced by mass 16 overcomes the biasing force of biasing member 18. However, an electromagnetic field produced by electromagnetic enclosure 29 may be controlled to counteract the outward radial movement of mass 16. Thus, the position of mass 16, and therefore the amount of vibration produced, may be controlled via a strengthening or weakening of the electromagnetic field surrounding mass 16 independently of the biasing force. The electromagnetic enclosure 29, in effect, functions as a secondary biasing member.

Figure 6:
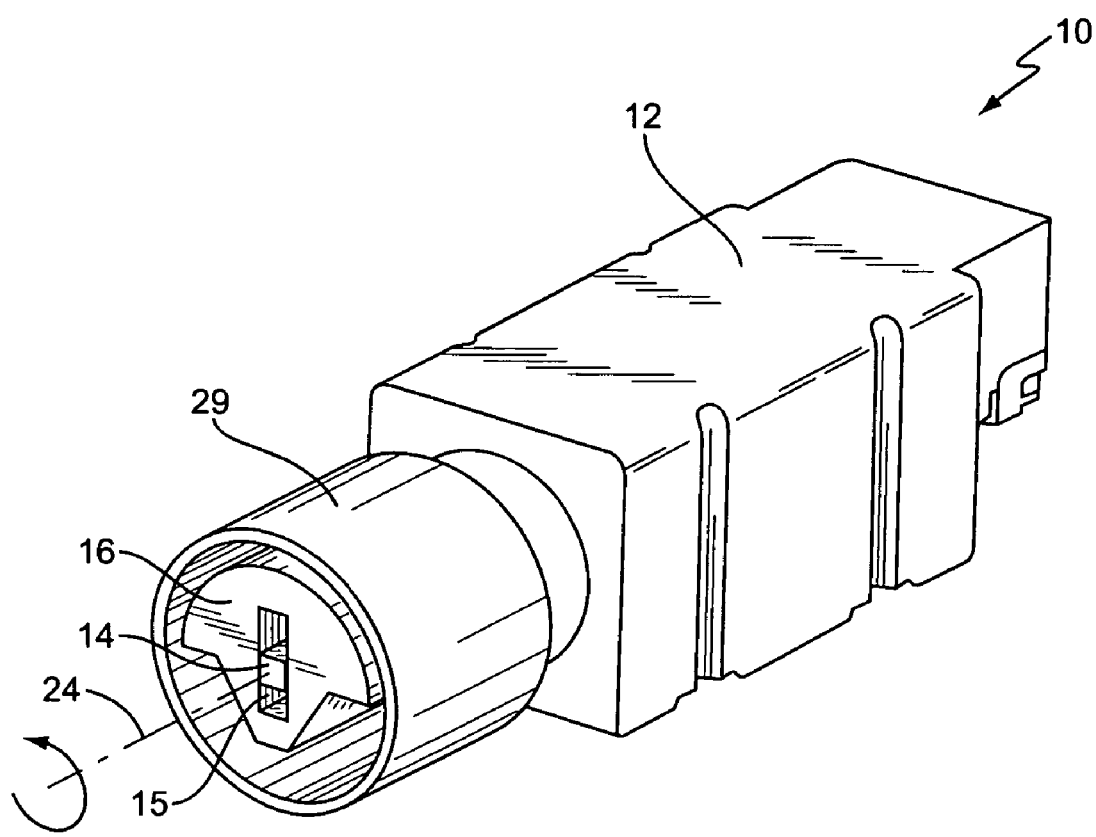
FIG. 6 illustrates another embodiment of the present invention.

FIG. 6 illustrates an alternative embodiment of FIG. 5 that does not include a biasing member 18. In this embodiment, the electromagnetic enclosure 29 acts as a primary biasing member that biases mass 16 inwardly towards axis 24. Particularly, the strength of the electromagnetic field produced by electromagnetic enclosure 29 may be controlled (e.g., increased or decreased) to permit radial movement of mass 16 radially inward and outward.

Figure 7:
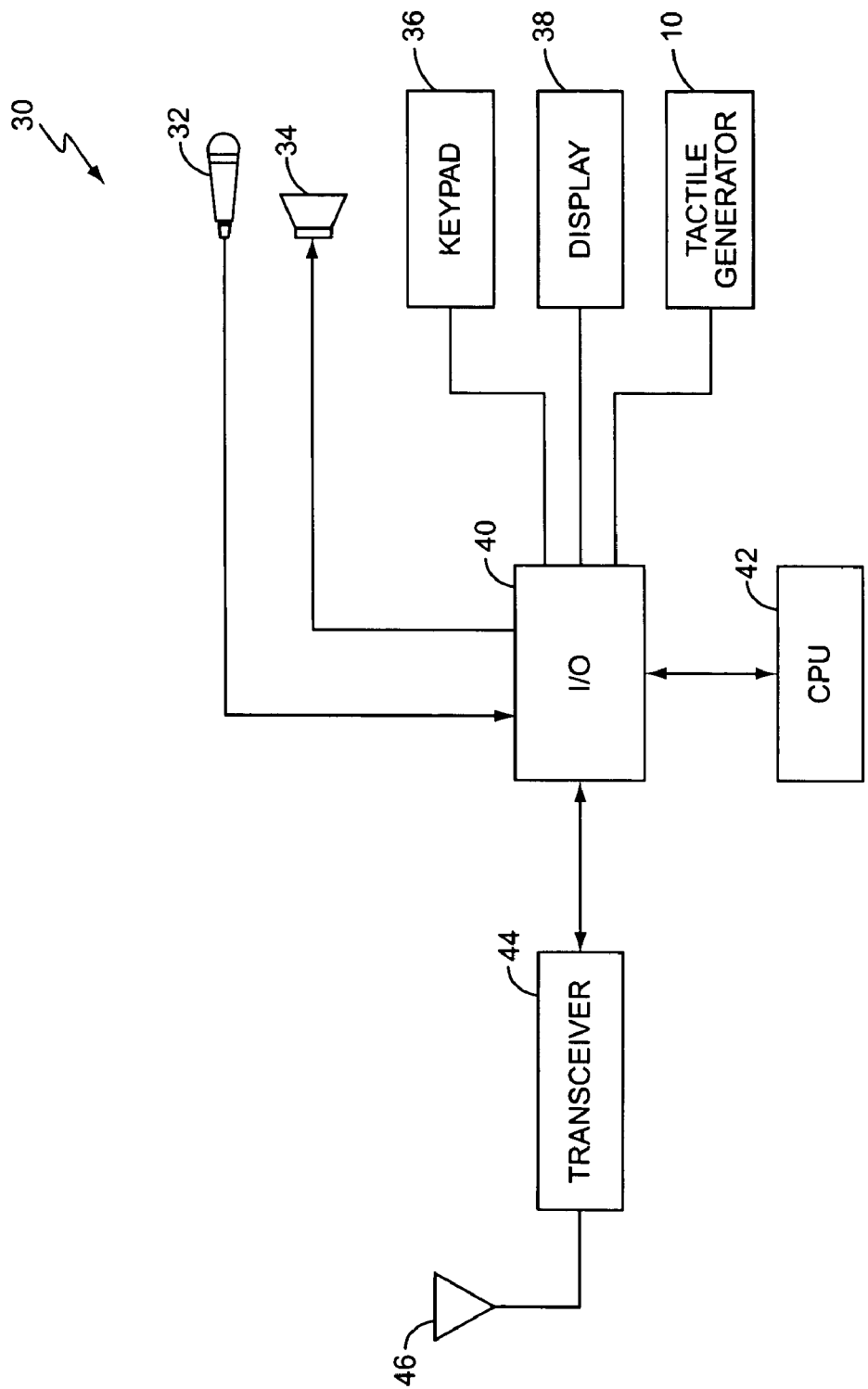
FIG. 7 illustrates one embodiment of the present invention used in a wireless communications device.

As seen in FIG. 7, tactile generator 10 may be employed in a wireless communications device 30. Wireless communications device 30 may be, for example, a mobile telephone, a satellite phone, or a personal digital assistant (PDA), and comprises a microphone 32, a speaker 34, a keypad 36, a display 38, a transceiver 44 connected to an antenna 46, and a controller 42. Other components may also be included as desired. Each of these components may be communicatively connected to each other by input/output (I/O) interface 40. Other than described below, device 30 is a typical wireless communications device, and as such, the operation of transceiver 44, antenna 46, I/O interface 40, keypad 36, speaker 34, and display 38 is not described in detail. It is sufficient to say that device 30 permits a user to send and receive calls to/from a remote party.

However, unlike conventional wireless communications devices, device 30 includes circuitry that permits autonomous control of tactile generator 10. More particularly, controller 42, which may comprise a microprocessor or the like, controls the amount of vibration produced by tactile generator 10. In one embodiment, controller 42 controls the rotational speed of motor 12, and thus, the position of mass 16, by generating control signals based on a detected level of ambient noise.

Generally, higher levels of vibration produce higher levels of acoustic noise. Thus, conventional vibrating devices produce an amount of acoustic noise that corresponds to their fixed level of vibration. However, this level of noise may still be unacceptable in some situations. Therefore, the present invention produces a vibration level that is optimized for the detected level of ambient noise. This keeps the generated acoustic noise to a minimum while still permitting the user to feel the vibration.

Figure 8:
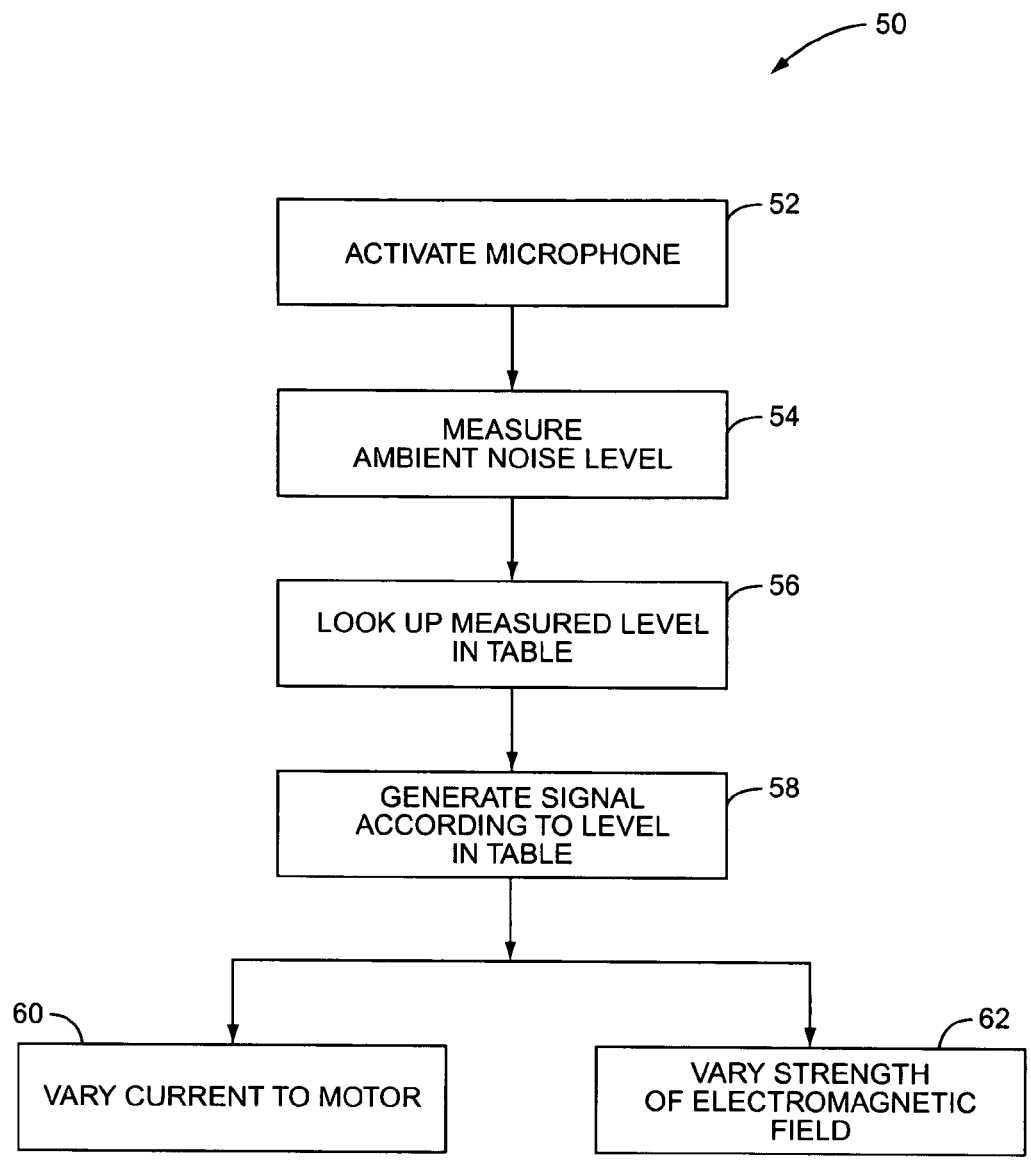
FIG. 8 illustrates a method of detecting ambient noise levels according to one embodiment of the present invention.

One method 50 of optimizing vibration according to the detected level of ambient noise is shown in FIG. 8. By way of example, controller 42 may activate microphone 32 upon receipt of an incoming call to sense ambient noise prior to alerting the user (box 52). Logic in controller 42, or alternatively, in another component, would measure the detected ambient noise (box 54). The controller 42 could then use a predetermined look-up table to determine how to vary the vibration (box 56). In this embodiment, the look-up table maps measured noise levels to corresponding voltage levels. An alternate embodiment employs a look-up table mapping measured noise levels to corresponding current levels. However, those skilled in the art will appreciate that the present invention is not limited to a look-up table and further, that other types of information may be stored. Controller 42 would then provide a control signal to tactile generator 10 responsive to the detected noise level and the values in the look-up table (box 58). The higher the noise level, the more vibration would be produced. For example, various vibration levels may be achieved by providing varying levels of voltage/current to motor 12 (box 60). In addition, varying levels of voltage may be applied to the electromagnetic enclosure 29 to strengthen or weaken the electromagnetic field accordingly (box 62).

As previously stated, mass 16 moves radially outward from axis 24, which tends to decrease the rotational speed of mass 16. The control signals generated by controller 42 could be used to counter this tendency, and thus, substantially maintain a desired rotational speed of mass 16. For example, tactile generator 10 could periodically determine the rotational speed of mass 16 by using internal circuitry to measure the torque applied to output shaft 14. In another example, tactile generator 10 could use an internal sensor to periodically measure the actual distance of mass 16 from output shaft 16 or axis 24. Tactile generator 10 might then provide a signal indicative of the measured rotational speed of mass 16 to controller 42, which could use the information to calculate the rotational speed of mass 16. Based on this calculation, controller 42 could increase, decrease, or maintain the voltage/current level supplied to motor 12 to affect the rotational speed of mass 16.

Further, the present invention might provide various levels of vibration responsive to ambient noise levels in situations other than when device 30 receives an incoming call. For example, tactile generator 10 of the present invention may be configured to produce multiple levels of vibration for various games or levels of play in games, receipt of alerts, pages, and alarms.

Those skilled in the art will readily appreciate that tactile generator 10 may in fact be used in other communication devices not explicitly shown in the Figures, as well as in other devices such as game controllers. Additionally, the biasing member 18 is not limited to the springs or electromagnetic enclosure 29 shown in the Figures. Rather, biasing member 18 may also comprise compressive foams or the like.

It should be understood that the present invention also contemplates other types of vibration motors other than those specifically shown here. For example, the present invention may be embodied as a pancake vibrator. Pancake vibrators are flat, pancake-shaped disks driven to rotate eccentrically about an axis of rotation. These types of vibrators can be adapted to include the movable mass 16 along the plane of the disk. Mass 16 would be biased towards the axis of rotation by biasing member 18, but would permit mass 16 to move or slide away from the axis of rotation when the disk rotates. As in the previous embodiments, varying the rotational speed of the disk and motor current would produce varying levels of vibration. These types of vibrators could be used, for example, to produce tactile output in game controllers, pagers, and communication devices.

Additionally, the radial movement of mass 16 with respect to axis (24) is not solely dependent upon the rotational speed of mass 16. In fact, mass 16 may move independently of the rotational speed of mass 16. For example, alternate embodiments of the present invention contemplate the use of a servo-motor or solenoid that moves the mass 16 outwardly and inwardly responsive to control signals generated by controller 42, for example.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A tactile generator comprising:
   an electric motor;
   an eccentric mass rotated by the motor about a rotational axis to produce vibration, the mass being radially movable to vary a distance between the mass and the axis; and
   wherein the distance of the mass from the axis is dependent on a rotational speed of the mass, and varying the distance of the mass from the axis varies the amount of vibration generated when the mass is rotated.

2. The tactile generator of claim 1 wherein the electric motor rotates the mass via an output shaft interconnecting the mass and the electric motor.

3. The tactile generator of claim 2 further comprising a biasing member to urge the mass towards the axis.

4. The tactile generator of claim 3 wherein the biasing member comprises a spring.

5. The tactile generator of claim 3 wherein the biasing member comprises a magnet.

6. The tactile generator of claim 3 wherein the biasing member comprises an electromagnet.

7. The tactile generator of claim 3 further comprising an extension including a mechanical stop, the extension being attached at one end to the shaft.

8. The tactile generator of claim 7 wherein the biasing member is disposed on the extension between the mechanical stop and the mass.

9. The tactile generator of claim 7 wherein the biasing member is disposed on the shaft.

10. The tactile generator of claim 1 wherein a controller controls the vibration produced by the mass by controlling the distance of the mass from the axis.

11. The tactile generator of claim 10 wherein the controller varies a speed of the electric motor.

12. The tactile generator of claim 10 wherein the controller varies the strength of a magnetic field of an electromagnet.

13. The tactile generator of claim 10 wherein the controller varies the distance between the mass and the axis responsive to ambient noise levels.

14. The tactile generator of claim 10 wherein the controller maintains a desired rotational speed of the mass.

15. The tactile generator of claim 1 wherein the vibration produced by the rotating mass varies proportionally to the distance of the mass from the axis.

16. A wireless communications device comprising:
a transceiver coupled to an antenna to communicate with a remote party;
a controller to generate control signals responsive to a detected ambient noise level; and
a tactile generator responsive to the control signals, the tactile generator comprising:
an electric motor;
an eccentric mass rotated by the motor about a rotational axis to produce vibration, the mass being radially movable to vary a distance between the mass and the axis; and
wherein varying the distance of the mass from the axis varies the amount of vibration generated when the mass is rotated.

17. The wireless communications device of claim 16 wherein upon rotation of the mass, the distance of the mass from the axis is dependent on the rotational speed of the mass.

18. The wireless communications device of claim 16 further comprising an output shaft rotated about the axis by the electric motor.

19. The wireless communications device of claim 18 wherein the rotating output shaft rotates the mass about the axis.

20. The wireless communications device of claim 16 further comprising a biasing member to urge the mass towards the axis.

21. The wireless communications device of claim 20 wherein the biasing member comprises a spring.

22. The wireless communications device of claim 20 wherein the biasing member comprises a magnet.

23. The wireless communications device of claim 20 wherein the biasing member comprises an electromagnet.

24. The wireless communications device of claim 16 wherein the controller varies the radial distance of the mass from the axis responsive to the detected ambient noise level.

25. The wireless communications device of claim 24 further comprising a microphone to detect the ambient noise level.

26. The wireless communications device of claim 24 wherein the controller varies the speed of the electric motor.

27. The wireless communications device of claim 24 wherein the controller varies the strength of a magnetic field of an electromagnetic magnet.

28. The wireless communications device of claim 24 wherein the controller maintains the rotational speed of the mass.

29. The wireless communications device of claim 16 wherein the wireless communications device comprises a cellular telephone.

30. The wireless communications device of claim 16 wherein the vibration produced by the rotating mass varies proportionally to the distance of the center of mass from the axis.

31. A method of providing tactile functions in a wireless communications device comprising:
rotating an eccentric mass about a rotational axis to impart a vibration to the wireless communications device; and
varying a radial distance of the mass from the axis to vary the amount of vibration generated when the mass is rotated, wherein the vibration produced by the rotating mass is dependent on a rotational speed of the mass.

32. The method of claim 31 wherein rotating an eccentric mass about a rotational axis comprises rotating an output shaft with an electric motor.

33. The method of claim 31 further comprising biasing the mass towards the axis.

34. The method of claim 31 further comprising measuring the ambient noise level.

35. The method of claim 34 further comprising generating a control signal indicative of the measured ambient noise level.

36. The method of claim 35 wherein varying a radial distance of the mass from the axis comprises varying the radial distance responsive to the control signal.

37. The method of claim 31 wherein varying a radial distance of the mass from the axis comprises controlling the speed of the electric motor.

38. The method of claim 37 wherein controlling the speed of the electric motor comprises controlling the speed of the electric motor to impart a rotational force to the shaft in discrete levels.

39. The method of claim 37 wherein controlling the speed of the electric motor comprises controlling the speed of the motor to maintain a desired rotational speed of the mass.

40. The method of claim 31 wherein varying a radial distance of the mass from the axis comprises controlling a strength of an electromagnet surrounding the mass.

41. The method of claim 31 wherein the vibration produced by the rotating mass is proportional to the distance of the mass from the axis.

42. A tactile generator comprising:
an eccentric mass rotated about a rotational axis, the mass being radially movable to vary a distance between the mass and the axis; and
wherein the distance of the mass from the axis is dependent on a rotational speed of the mass, and varying the distance of between the mass and the axis varies the amount of vibration generated when the mass is rotated.

43. The tactile generator of claim 42 further comprising an electric motor having an output shaft to rotate the mass.

44. The tactile generator of claim 42 further comprising a biasing member to urge the mass towards the axis.

45. The tactile generator of claim 42 wherein the radial distance of the mass from the axis is controlled responsive to ambient noise levels.

* * * * *